United States Patent
Noh et al.

(10) Patent No.: US 10,341,892 B2
(45) Date of Patent: Jul. 2, 2019

(54) METHOD FOR MEASURING INTER-DEVICE INTERFERENCE IN WIRELESS COMMUNICATION SYSTEM SUPPORTING FDR TRANSMISSION, AND APPARATUS THEREFOR

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 15/511,609

(22) PCT Filed: Sep. 30, 2015

(86) PCT No.: PCT/KR2015/010292
§ 371 (c)(1),
(2) Date: Mar. 15, 2017

(87) PCT Pub. No.: WO2016/052980
PCT Pub. Date: Apr. 7, 2016

(65) Prior Publication Data
US 2017/0311192 A1 Oct. 26, 2017

Related U.S. Application Data

(60) Provisional application No. 62/058,082, filed on Sep. 30, 2014.

(51) Int. Cl.
*H04W 24/10* (2009.01)
*H04W 72/08* (2009.01)
(Continued)

(52) U.S. Cl.
CPC ............. *H04W 24/10* (2013.01); *H04J 11/00* (2013.01); *H04J 13/00* (2013.01); *H04L 5/0048* (2013.01);
(Continued)

(58) Field of Classification Search
CPC ............. H04W 24/10; H04W 72/0446; H04W 72/082; H04J 11/00; H04J 13/00; H04L 5/0048; H04L 27/2607
See application file for complete search history.

(56) References Cited

U.S. PATENT DOCUMENTS

| 2003/0026363 A1* | 2/2003 | Stoter ................ H03G 3/3052 375/345 |
| 2005/0195733 A1* | 9/2005 | Walton ................ H04B 7/0413 370/208 |

(Continued)

FOREIGN PATENT DOCUMENTS

| EP | 3110034 | 12/2016 |
| KR | 1020140049586 | 4/2014 |

(Continued)

OTHER PUBLICATIONS

European Patent Office Application Serial No. 15845831.5, Search Report dated May 7, 2018, 9 pages.

(Continued)

*Primary Examiner* — Brandon M Renner
*Assistant Examiner* — Jay L Vogel
(74) *Attorney, Agent, or Firm* — Lee Hong Degerman Kang Waimey

(57) ABSTRACT

The present invention relates to a wireless access system supporting a full duplex radio (FDR) transmission environment. The method by which a transmission terminal transmits a reference signal for interference measurement in a wireless communication system supporting FDR, according (Continued)

to one embodiment of the present invention, comprises the steps of: a transmission terminal configuring a measurement subframe for measuring inter-device interference; mapping a preamble to the measurement subframe; and transmitting, to a reception terminal, a reference signal through the measurement subframe to which the preamble has been mapped.

7 Claims, 14 Drawing Sheets

(51) Int. Cl.
*H04W 72/04* (2009.01)
*H04L 27/26* (2006.01)
*H04L 5/00* (2006.01)
*H04J 11/00* (2006.01)
*H04J 13/00* (2011.01)
*H04W 88/08* (2009.01)
*H04W 88/02* (2009.01)

(52) U.S. Cl.
CPC ..... *H04L 27/2607* (2013.01); *H04W 72/0446* (2013.01); *H04W 72/082* (2013.01); *H04W 88/02* (2013.01); *H04W 88/08* (2013.01)

(56) References Cited

U.S. PATENT DOCUMENTS

| | | | | |
|---|---|---|---|---|
| 2008/0089394 | A1* | 4/2008 | Poberezhskiy | H04B 1/707 375/145 |
| 2009/0010240 | A1* | 1/2009 | Papasakellariou | H04L 5/0007 370/344 |
| 2009/0225707 | A1* | 9/2009 | Baldemair | H04J 13/0003 370/329 |
| 2011/0013720 | A1* | 1/2011 | Lee | H04J 3/0682 375/295 |
| 2012/0320848 | A1* | 12/2012 | Chen | H04W 28/06 370/329 |
| 2013/0322276 | A1* | 12/2013 | Pelletier | H04W 72/085 370/252 |
| 2015/0146633 | A1* | 5/2015 | Kalhan | H04L 1/1607 370/329 |
| 2015/0229507 | A1* | 8/2015 | Kim | H04L 27/2692 375/260 |
| 2015/0245375 | A1* | 8/2015 | Li | H04L 5/0051 370/329 |

FOREIGN PATENT DOCUMENTS

| | | |
|---|---|---|
| WO | 2013134930 | 9/2013 |
| WO | 2013137589 | 9/2013 |

OTHER PUBLICATIONS

PCT International Application No. PCT/KR2015/010292, Written Opinion of the International Searching Authority dated Jan. 21, 2016, 17 pages.

Alcatel-Lucent, "D2D transmission timing", 3GPP TSG RAN WG1 Meeting #76, R1-140177, Feb. 2014, 5 pages.

Alcatel-Lucent, "Discovery signal design details", 3GPP TSG RAN WG1 Meeting #75, R1-135177, Nov. 2013, 6 pages.

Ericsson, "In-band Interference Modeling for D2D", 3GPP TSG RAN WG1 Meeting #72bis, R1-131622, Apr. 2013, 8 pages.

* cited by examiner

FIG. 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(a)

(b)

|  | | subframe | | | | |
|---|---|---|---|---|---|---|
|  | | #0 | #1 | #2 | #3 | #4 |
| Measurement UE | a | UL | DL | DL | DL | DL |
|  | b | DL | UL | DL | DL | DL |
|  | c | DL | DL | UL | DL | DL |
|  | d | DL | DL | DL | UL | DL |
|  | e | DL | DL | DL | DL | UL |

(a)  (b)

METHOD FOR MEASURING INTER-DEVICE INTERFERENCE IN WIRELESS COMMUNICATION SYSTEM SUPPORTING FDR TRANSMISSION, AND APPARATUS THEREFOR

CROSS-REFERENCE TO RELATED APPLICATIONS

This application is the National Stage filing under 35 U.S.C. 371 of International Application No. PCT/KR2015/010292, filed on Sep. 30, 2015, which claims the benefit of U.S. Provisional Application No. 62/058,082, filed on Sep. 30, 2014, the contents of which are all hereby incorporated by reference herein in their entirety.

TECHNICAL FIELD

The present invention relates to a wireless communication system, and more particularly, to a method for measuring inter-device interference (IDI) in a full-duplex wireless communication system and apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency-division multiple access (SC-FDMA) system.

DISCLOSURE OF THE INVENTION

Technical Task

A technical task of the present invention is to provide a method for efficiently measuring IDI in a full-duplex wireless communication system and apparatus therefor.

Another technical task of the present invention is a method for designing a signal for efficient IDI measurement and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first aspect of the present invention, provided herein is a method of transmitting a reference signal for interference measurement by a transmitting user equipment (UE) in a wireless communication system supporting full duplex radio (FDR), including: configuring, by the transmitting UE, a measurement subframe for measuring interference between UEs; mapping a preamble to the measurement subframe; and transmitting the reference signal to a receiving UE through the measurement subframe to which the preamble is mapped. In this case, a prescribed time before the preamble may be set as a first guard time.

In this case, the reference signal transmission method may further include receiving, by the transmitting UE, information for generating the preamble from a base station (BS).

In a second aspect of the present invention, provided herein is a method of measuring interference between user equipments (UEs) by a receiving UE in a wireless communication system supporting full duplex radio (FDR), including: receiving a reference signal from a transmitting UE through a measurement subframe configured to measure the interference between the UEs; and measuring the interference between the UEs based on the reference signal. In this case, the measurement subframe may include a preamble and a prescribed time before the preamble may be set as a first guard time.

In a third aspect of the present invention, provided herein is a transmitting user equipment (UE) in a wireless communication system supporting full duplex radio (FDR), including a transceiver module configured to transmit and receive signals to and from a receiving UE or a base station (BS); and a processor. In this case, the processor may be configured to configure a measurement subframe for measuring interference between UEs, map a preamble to the measurement subframe, and control the transceiver module to transmit a signature signal to the receiving UE through the measurement subframe to which the preamble is mapped. In addition, a prescribed time before the preamble may be set as a first guard time.

In a fourth aspect of the present invention, provided herein is a receiving user equipment (UE) in a wireless communication system supporting full duplex radio (FDR), including: a transceiver module configured to transmit and receive signals to and from a transmitting UE or a base station (BS); and a processor. In this case, the processor may be configured to control the transceiver module to receive a signature signal from the transmitting UE through a measurement subframe configured to measure interference between UEs and to measure the interference between the UEs based on the signature signal. In this case, the measurement subframe may include a preamble and a prescribed time before the preamble may be set as a first guard time.

The following items may be commonly applied to the first to fourth aspects of the present invention.

A prescribed time after the preamble may be further set as a second guard time.

Preferably, at least one of the first guard time and the second guard time may be set as a zero-power transmission interval.

In addition, at least one of the first guard time and the second guard time may be set as a cyclic prefix (CP).

In this case, at least one of the first guard time and the second guard time may be determined in consideration of a propagation delay.

Further, the preamble may be generated using a constant amplitude zero autocorrelation (CAZAC) sequence.

Advantageous Effects

According to embodiments of the present invention, a user equipment can efficiently measure IDI in a full-duplex wireless communication system.

It will be appreciated by persons skilled in the art that the effects that can be achieved through the present invention are not limited to what has been particularly described herein-

DESCRIPTION OF DRAWINGS

FIG. 2 illustrates exemplary frame configurations for the radio frame structure shown in FIG. 1.

BEST MODE FOR INVENTION

Figure 1:
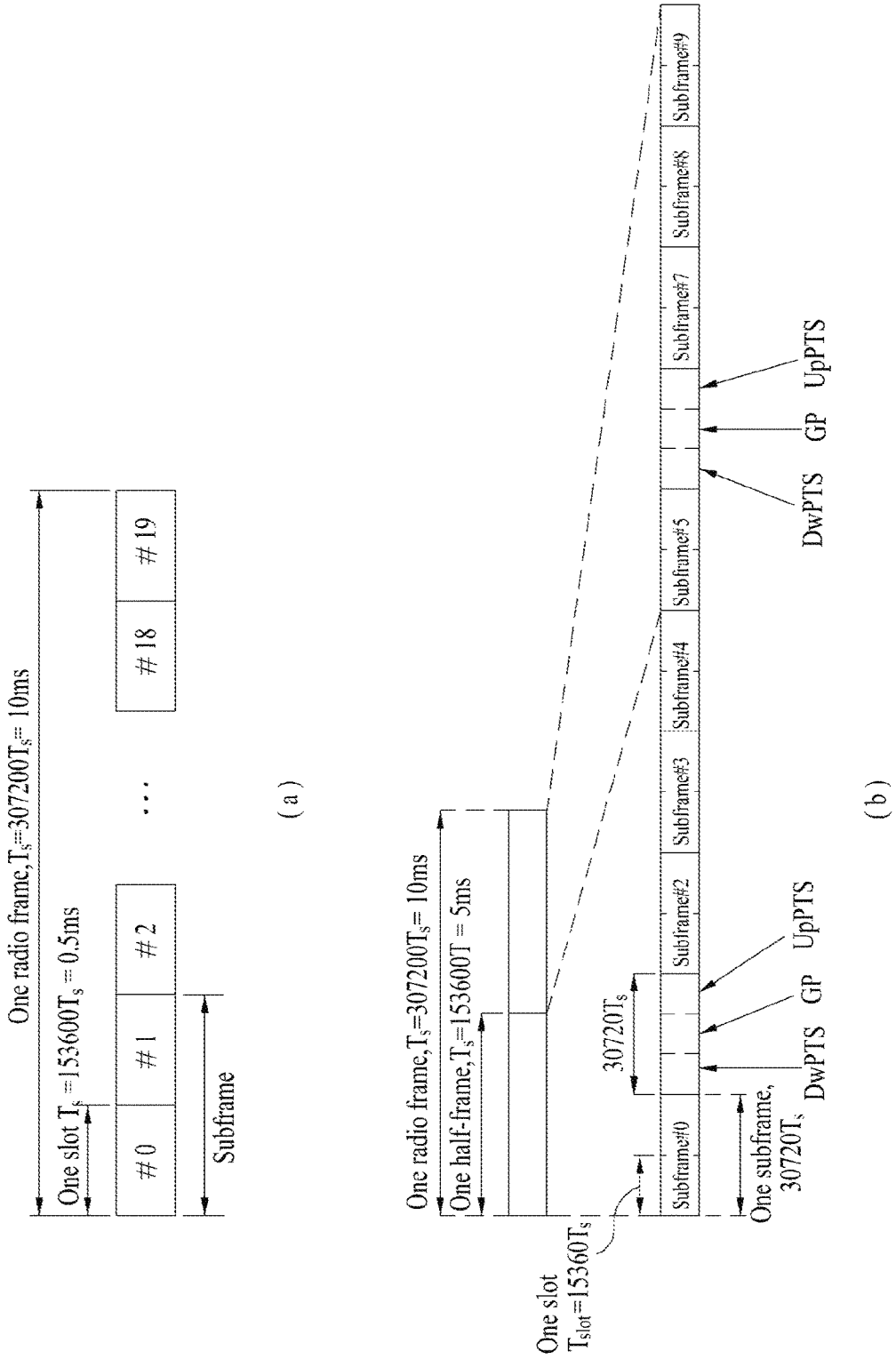
FIG. 1 illustrates a structure of a radio frame used in the 3GPP LTE system.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

The embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

Hereinafter, a radio frame structure in 3GPP LTE (-A) will be described with reference to FIG. 1. In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols.

FIG. 1(b) illustrates the frame structure type 2. The frame structure type 2 is applied to a time division duplex (TDD) system. One radio frame has a length of 10 ms (i.e., $T_f$=307200·$T_s$), including two half-frames each having a length of 5 ms (i.e., 153600·$T_s$). Each half-frame includes five subframes each having a length of 1 ms (i.e., 30720·$T_s$). An $i^{th}$ subframe includes $(2i)^{th}$ and $(2i+1)^{th}$ slots each having a length of 0.5 ms (i.e., $T_{slot}$=15360·$T_s$) where $T_s$ is a sampling time given as $T_s$=1/(15 kHz×2048)=3.2552×10$^{-8}$ (i.e., about 33 ns).

A type-2 frame includes a special subframe having three fields of downlink pilot time slot (DwPTS), guard period (GP), and uplink pilot time slot (UpPTS). The DwPTS is used for initial cell search, synchronization, or channel estimation at a UE and the UpPTS is used for channel estimation and UL transmission synchronization with a UE at an eNB. The GP is used to cancel UL interference between UL and DL, caused by the multi-path delay of a DL signal. The DwPTS, GP and UpPTS is included in the special subframe of Table 1.

FIG. 2 illustrates examples of frame configurations of the radio frame structure in FIG. 1.

In FIG. 2, 'D' represents a subframe for DL transmission, 'U' represents a subframe for UL transmission, and 'S' represents a special subframe for a guard time.

All UEs in each cell have one common frame configuration among the configurations shown in FIG. 2. That is, since a frame configuration is changed depending on a cell, the frame configuration may be referred to as a cell-specific configuration.

Figure 3:
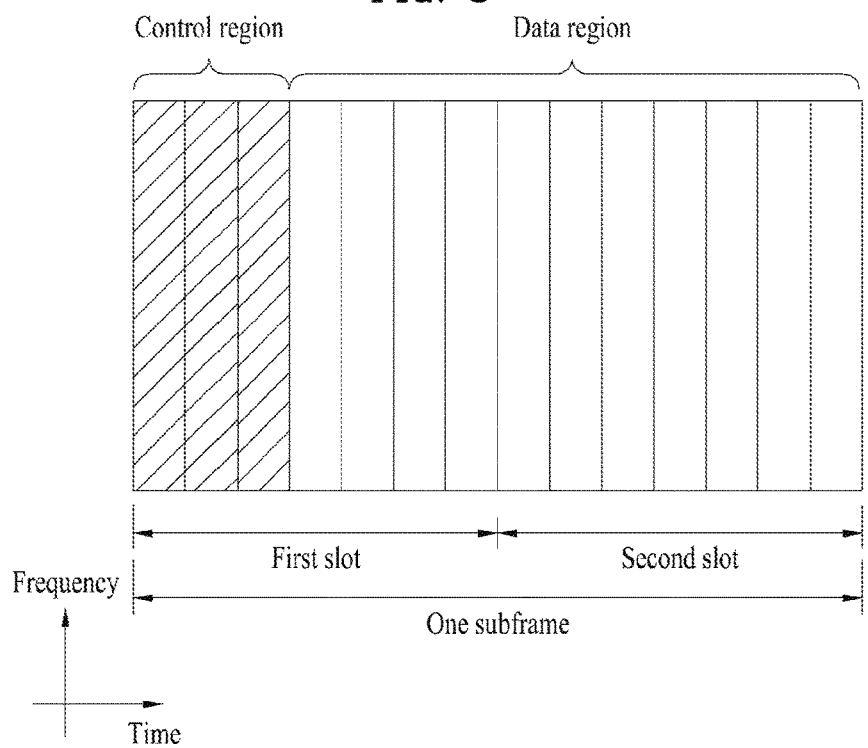
FIG. 3 is a diagram illustrating a downlink subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
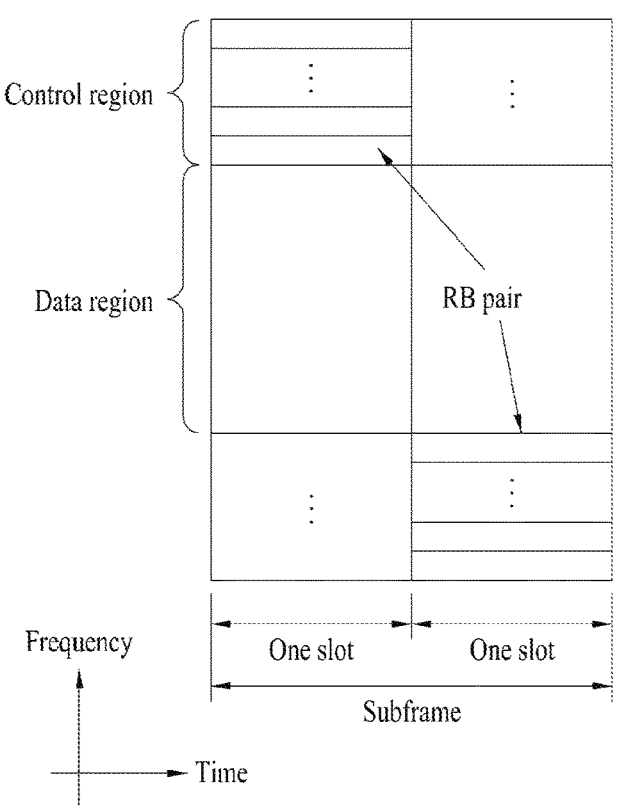
FIG. 4 is a diagram illustrating an uplink subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Modeling of Multiple Input Multiple Output (MIMO) System

An MIMO system improves data transmission/reception efficiency using multiple transmitting antennas and multiple receiving antennas. According to the MIMO technology, entire data can be received by combining a plurality of pieces of data received through a plurality of antennas instead of using a single antenna path to receive a whole message.

The MIMO technology can be classified into a spatial diversity scheme and a spatial multiplexing scheme. Since the spatial diversity scheme increases transmission reliability or a cell radius through a diversity gain, it is suitable for data transmission at a fast moving UE. According to the spatial multiplexing scheme, different data are simultaneously transmitted and thus a high data transfer rate can be achieved without increasing a system bandwidth.

Figure 5:
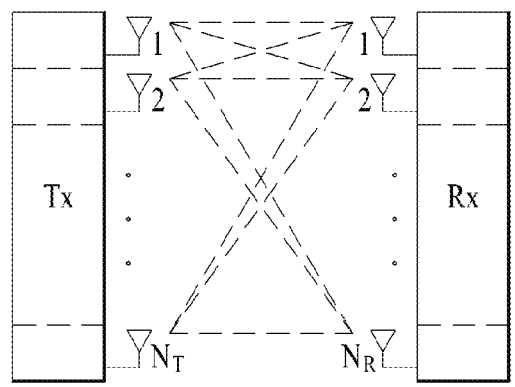
FIG. 5 is a diagram illustrating a configuration of a wireless communication system supporting multiple antennas.
Figure 5:
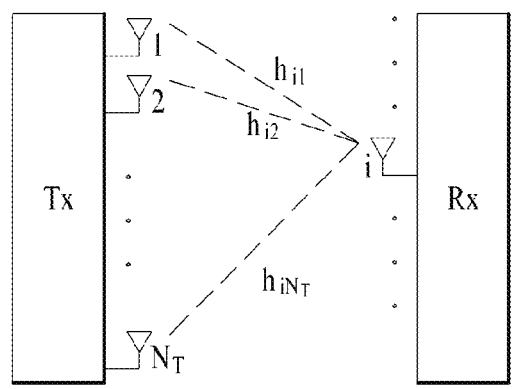

FIG. 5 is a diagram illustrating a configuration of a wireless communication system having multiple antennas. As shown in FIG. 5(a), if the number of transmitting antennas is increased to $N_T$ and the number of receiving antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Communication in the MIMO system will be described in detail through mathematical modeling. It is assumed that the system has $N_T$ transmitting antennas and $N_R$ receiving antennas.

Regarding a transmitted signal, since up to $N_T$ pieces of information can be transmitted through the $N_T$ transmitting antennas, the transmitted signal can be expressed as Equation 2 below.

$$s = [s_1, s_2, \ldots, s_{N_T}]^T \qquad \text{[Equation 2]}$$

Meanwhile, for each of the transmission information $s_1, s_2, \ldots s_{N_T}$, a transmit power may be differentiated according to the each of the transmission information. In this case, if each of the transmit powers is represented as $P_1, P_2, \ldots, P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In this case, $W_{ij}$ means a weighting between an $i^{th}$ transmitting antenna and $j^{th}$ information. The W is called the weight matrix or a precoding matrix.

The transmitted signal x may be differently processed based on two different schemes (for example, spatial diversity scheme and spatial multiplexing scheme). According to spatial multiplexing scheme, different signals are multiplexed and transmitted to a receiver such that elements of information vector(s) have different values. On the other hand, according to the spatial diversity scheme, the same signal is repeatedly transmitted through a plurality of channel paths such that elements of information vector(s) have the same value. The spatial multiplexing scheme and the spatial diversity scheme may be used in combination. For example, the same signal may be transmitted through three transmitting antennas according to the spatial diversity scheme and the remaining signals may be transmitted to the receiver according to the spatial multiplexing scheme.

In addition, signals $y_1, y_2, \ldots, y_{N_R}$ received at the $N_R$ receiving antennas can be expressed as Equation 6.

$$y = [y_1, y_2, \ldots, y_{N_R}]^T \qquad \text{[Equation 6]}$$

If channels are modeled in the MIMO wireless communication system, the channels can be distinguished according to transmitting/receiving antenna indexes. A channel from a transmitting antenna j to a receiving antenna i is denoted by $h_{ij}$. In $h_{ij}$, it is noted that a receiving antenna index precedes a transmitting antenna index in order of indices.

FIG. 5(b) illustrates channels from the $N_T$ transmitting antennas to the receiving antenna i. The channels may be combined and expressed in the form of a vector and a matrix. In FIG. 5(b), the channels from the $N_T$ transmitting antennas to the receiving antenna i may be expressed as shown in Equation 7.

$$h_i^T = [h_{i1}, h_{i2}, \ldots, h_{iN_T}] \qquad \text{[Equation 7]}$$

Accordingly, all the channels from the $N_T$ transmitting antennas to the $N_R$ receiving antennas can be expressed as shown in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

An Additive White Gaussian Noise (AWGN) is added to the actual channels after a channel matrix H. The AWGN $n_1$, $n_2, \ldots, n_{N_R}$ respectively added to the $N_R$ receiving antennas can be expressed as shown in Equation 9.

$$n = [n_1, n_2, \ldots, n_{N_R}]^T$$ [Equation 9]

Through the above-described mathematical modeling, the received signals can be expressed as shown in Equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_j \\ \vdots \\ n_{N_R} \end{bmatrix} =$$ [Equation 10]

$$Hx + n$$

The number of rows and columns of the channel matrix H indicating a channel state is determined by the number of the transmitting and receiving antennas. The number of the rows of the channel matrix H is equal to $N_R$, i.e., the number of the receiving antennas and the number of the columns thereof is equal to $N_T$, i.e. the number of the transmitting antennas. That is, the channel matrix H is an $N_R \times N_T$ matrix.

A rank of a matrix is defined by the smaller of the number of rows or columns, which are independent of each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

In MIMO transmission, the term 'rank' denotes the number of paths for independently transmitting signals, and the term 'number of layers' denotes the number of signal streams transmitted through each path. In general, since a transmitting end transmits layers corresponding in number to the number of ranks used for signal transmission, rank has the same meaning as the number of layers unless otherwise specified.

Meanwhile, a transmitter in the MIMO system may be configured to include an encoder, a modulation mapper, a layer mapper, a precoder, a resource element mapper, and an OFDM signal generator. In addition, the transmitter may include $N_T$ transmitting antennas.

The encoder generates coded data by encoding input data according to a predetermined coding scheme. The modulation mapper maps the coded data to modulation symbols that represent positions on a signal constellation. There is no limitation in a modulation scheme and the modulation scheme may be m-phase shift keying (m-PSK) or m-quadrature amplitude modulation (m-QAM). For example, the m-PSK may be BPSK, QPSK, or 8-PSK and the m-QAM may be 16-QAM, 64-QAM, or 256-QAM.

The layer mapper defines layers of the modulation symbols such that the precoder can distribute antenna-specific symbols to paths of the respective antennas. In this case, the layers are defined as information paths inputted to the precoder. Information paths before the precoder may be referred to as virtual antennas or layers.

The precoder processes the modulation symbols according to a MIMO scheme based on multiple transmitting antennas to output the antenna-specific symbols. The precoder distributes the antenna-specific symbols to the resource element mappers in the paths of corresponding antennas. Each information path sent to a single antenna by the precoder is called a stream, which may be called a physical antenna.

The resource element mapper allocates the antenna-specific symbols to proper resource elements and the mapped antenna-specific symbols are multiplexed according to a user. The OFDM signal generator modulates the antenna-specific symbols according to an OFDM scheme and outputs OFDM symbols. The OFDM signal generator may perform Inverse Fast Fourier Transform (IFFT) on the antenna-specific symbols. In addition, a cyclic prefix (CP) may be inserted into a time domain symbol where the IFFT is performed. Here, the CP may mean a signal included in a guard interval to cancel inter-symbol interference caused by multiple paths in an OFDM-based transmission scheme. The above-mentioned OFDM symbols are transmitted through the respective transmitting antennas.

Reference Signal (RS)

Since a packet is transmitted on a radio channel in a wireless communication system, a signal may be distorted in the course of transmission. A receiving end needs to correct the distorted signal using channel information to receive a correct signal. To enable the receiving end to obtain the channel information, a transmitting end transmits a signal known to both a transmitting end and the receiving end. The receiving end obtains the channel information based on the degree of distortion occurring when the signal is received on the radio channel. Such a signal is called a pilot signal or a reference signal.

When data is transmitted and received through multiple antennas, the receiving ends needs to be aware of a channel state between each transmitting antenna and each receiving antenna to receive the data correctively. Accordingly, each transmitting antenna should have a separate reference signal.

In a mobile communication system, reference signals (RSs) are mainly classified into two types according to the purposes thereof: an RS for channel information acquisition and an RS for data demodulation. Since the former RS is used to allow a UE to acquire DL channel information, it should be transmitted over a wide band. In addition, even a UE which does not receive DL data in a specific subframe should be receive and measure the corresponding RS. Such an RS is also used for measurement of handover. The latter RS is transmitted when an eNB sends a resource in downlink. The UE may perform channel estimation by receiving this RS, thereby performing data modulation. Such an RS should be transmitted in a region in which data is transmitted.

The legacy 3GPP LTE (e.g., 3GPP LTE release-8) system defines two types of downlink RSs for unicast services: a common RS (CRS) and a dedicated RS (DRS). The CRS is used for acquisition of information on a channel state, measurement of handover, etc. and may be referred to as a cell-specific RS. The DRS is used for data demodulation and may be referred to as a UE-specific RS. In the legacy 3GPP LTE system, the DRS is used for data demodulation only and the CRS can be used for both purposes of channel information acquisition and data demodulation.

The CRS, which is cell-specific, is transmitted across a wideband in every subframe. Depending on the number of transmitting antennas of the eNB, it is possible to transmit CRSs for maximum four antenna ports. For instance, when the number of the transmitting antennas of the eNB is two, CRS for antenna ports 0 and 1 are transmitted. If the eNB has four transmitting antennas, CRSs for antenna ports 0 to 3 are transmitted.

Figure 6:
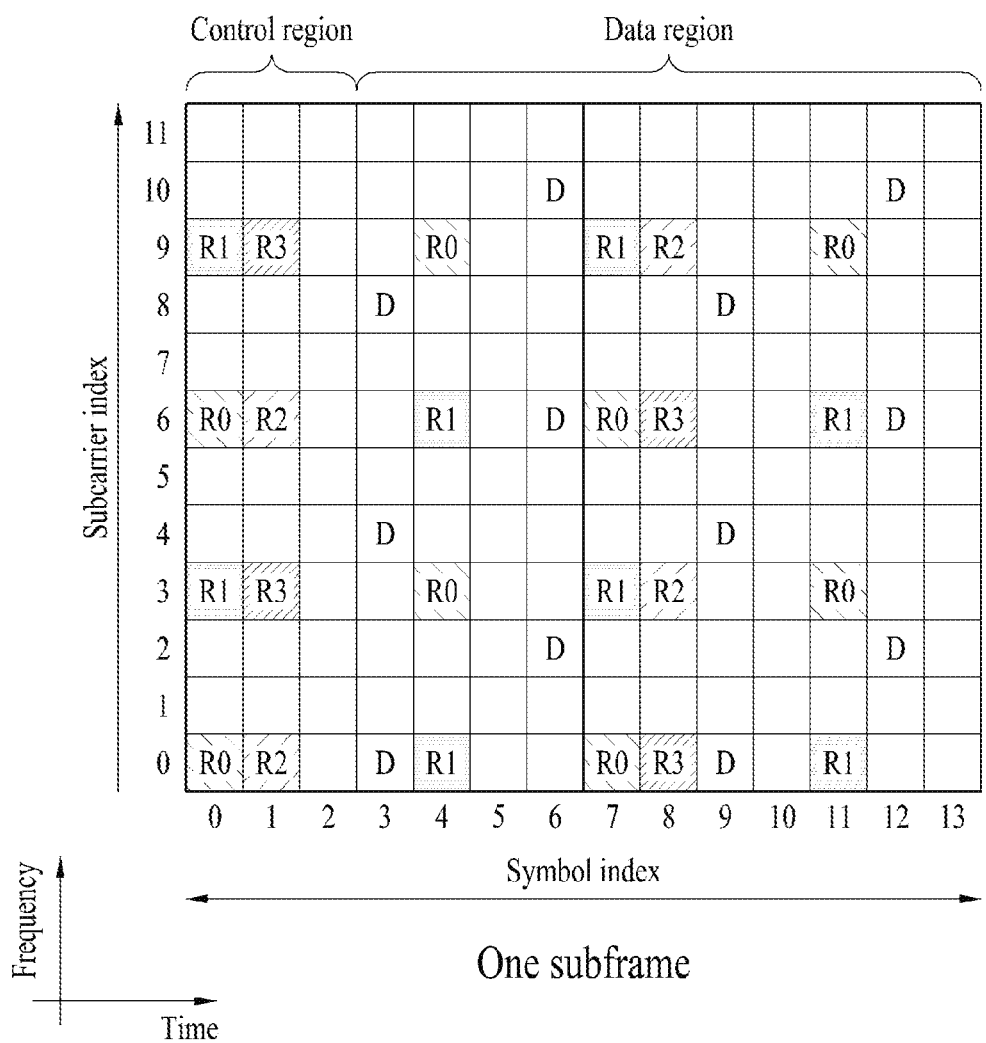
FIG. 6 illustrates an exemplary pattern for a CRS and a DRS in one resource block.

FIG. 6 illustrates CRS and DRS patterns for one resource block in a system where an eNB has four transmitting antennas (in case of a normal CP, one resource block includes 14 OFDM symbols in the time domain×12 subcarriers in the frequency domain). In FIG. 6, REs expressed as 'R0', 'R1', 'R2' and 'R3' respectively represent the positions of CRSs for antenna ports 0, 1, 2, and 3 and REs expressed as 'D' represent the positions of DRSs defined in the LTE system.

The LTE-A system, which is an evolved version of the LTE system, can support a maximum of 8 transmitting antennas on downlink. Accordingly, RSs for up to 8 transmitting antennas should be supported. Since downlink RSs are defined for up to four antenna ports in the LTE system, RSs for added antenna ports should be defined when the eNB has more than 4 up to 8 downlink transmitting antennas. As the RSs for a maximum of 8 transmitting antenna ports, both RSs for channel measurement and RSs for data demodulation should be considered.

One important consideration in design of the LTE-A system is backward compatibility. The backward compatibility refers to support of a legacy LTE UE that can properly operate in the LTE-A system. In terms of RS transmission, if RSs for up to 8 transmitting antenna ports are added in a time-frequency region in which CRSs defined in LTE standards are transmitted in every subframe over all bands, RS overhead excessively increases. Hence, when RSs for up to 8 antenna ports are designed, reduction of RS overhead should be considered.

The RSs newly introduced in the LTE-A system may be categorized into two types. One is a channel state information RS (CSI-RS) for channel measurement in order to select a transmission rank, a modulation and coding scheme (MCS), a precoding matrix index (PMI), etc. and the other is a modulation RS (DM RS) used for demodulating data transmitted through a maximum of 8 transmitting antennas.

The CSI-RS for channel measurement is mainly designed for channel measurement as opposed to the CRS in the legacy LTE system, used for channel measurement and handover measurement and simultaneously for data demodulation. Obviously, the CSI-RS may also be used for handover measurement. Since the CSI-RS is transmitted only for information acquisition on a channel state, the CSI-RS does not need to be transmitted in every subframe unlike the CRS in the legacy LTE system. Hence, to reduce CRS-RS overhead, the CSI-RS may be designated to be intermittently (e.g. periodically) transmitted in the time domain.

If data is transmitted in a certain downlink subframe, a dedicated DM RS is transmitted to a UE in which data transmission is scheduled. A DM RS dedicated to a specific UE may be designed such that the DM RS is transmitted only in a resource region scheduled for the specific UE, that is, only in a time-frequency region carrying data for the specific UE.

Figure 7:
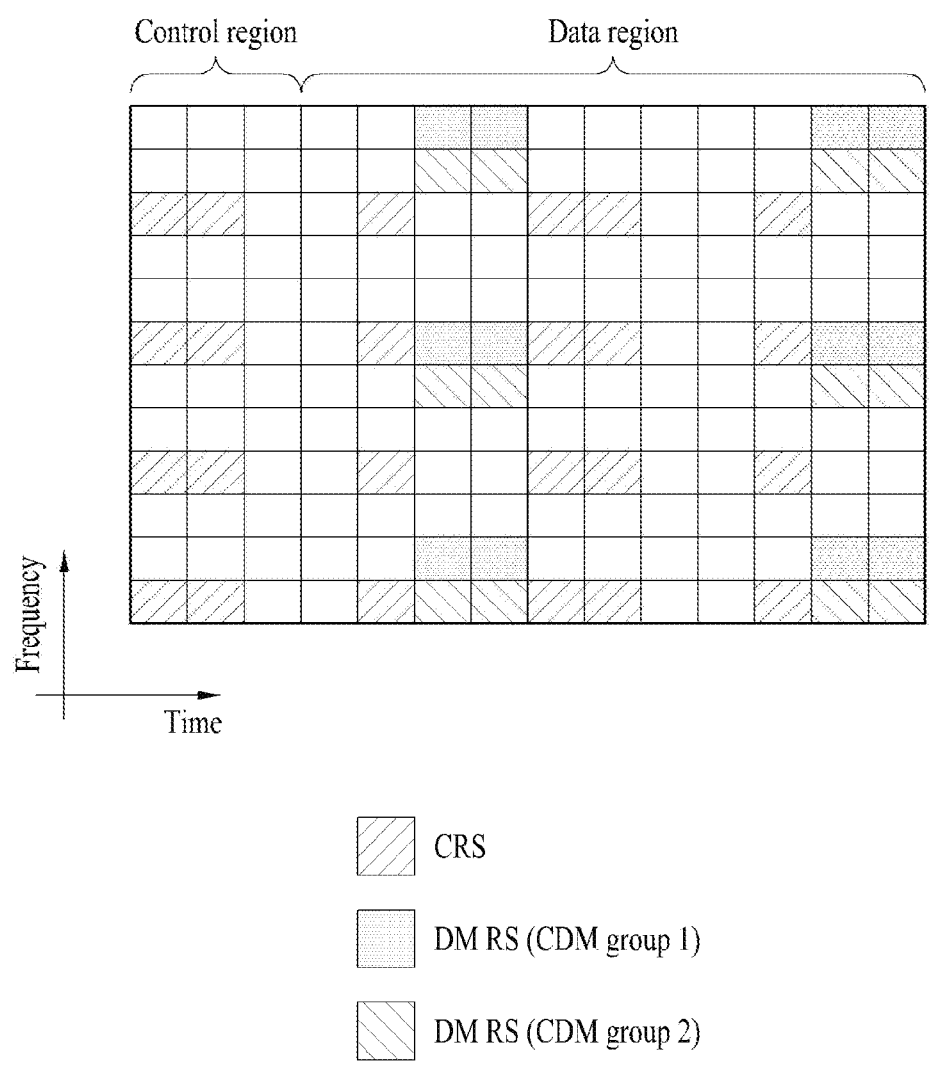
FIG. 7 is a diagram illustrating an exemplary DM RS pattern defined for the LTE-A system.

FIG. 7 is a diagram illustrating an example of a DM RS pattern defined in the LTE-A system. FIG. 7 shows the positions of REs carrying DM RSs in one resource block in which downlink data is transmitted (in the case of the normal CP, one resource block includes 14 OFDM symbols in the time domain×12 subcarriers in the frequency domain). The DM RSs may be transmitted for four antenna ports (antenna port indices 7, 8, 9 and 10), which are additionally defined in the LTE-A system. The DM RSs for different antenna ports may be distinguished with each other by different frequency resources (subcarriers) and/or different time resources (OFDM symbols) at which they are located. (i.e., the DM RSs may be multiplexed according to an FDM and/or TDM scheme). In addition, the DM RSs for different antenna ports located on the same time-frequency resources may be distinguished by orthogonal codes (i.e., the DM RSs may be multiplexed according to a CDM scheme). In the example of FIG. 7, DM RSs for antenna ports 7 and 8 may be located at REs expressed as DM RS CDM group 1 and they may be multiplexed by orthogonal codes. Similarly, in the example of FIG. 7, DM RSs for antenna ports 9 and 10 may be located at REs expressed as DM RS CDM group 2 and they may be multiplexed by orthogonal codes.

Figure 8:
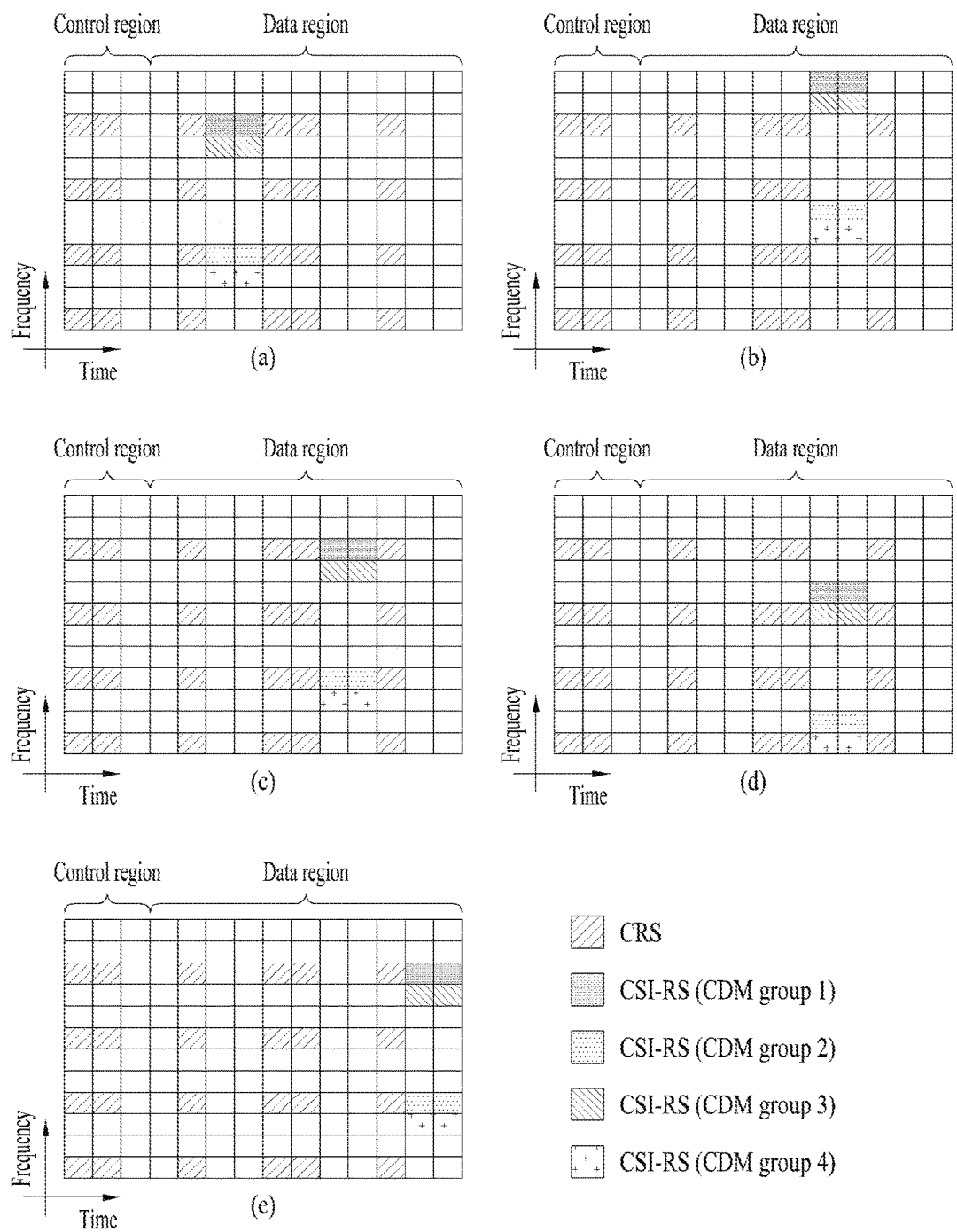
FIG. 8 is a diagram illustrating exemplary CSI-RS patterns defined for LTE-A system.

FIG. 8 is a diagram illustrating examples of a CSI-RS pattern defined in the LTE-A system. FIG. 8 shows the positions of REs carrying CSI-RSs in one resource block in which downlink data is transmitted (in the case of the normal CP, one resource block includes 14 OFDM symbols in the time domain×12 subcarriers in the frequency domain). One of the CSI-RS patterns shown in FIGS. 8(a) to 8(e) may be used in any downlink subframe. The CSI-RSs may be transmitted for 8 antenna ports (antenna port indices 15, 16, 17, 18, 19, 20, 21, and 22) additionally defined in the LTE-A system. The CSI-RSs for different antenna ports may be distinguished with each other by different frequency resources (subcarriers) and/or different time resources (OFDM symbols) at which they are located. (i.e., the CSI-RSs may be multiplexed according to the FDM and/or TDM scheme). The CSI-RSs for different antenna ports located on the same time-frequency resources may be distinguished by orthogonal codes (i.e. The CSI-RSs may be multiplexed according to the CDM scheme). In the example of FIG. 8(a), CSI-RSs for antenna ports 15 and 16 may be located at REs expressed as CSI-RS CDM group 1 and they may be multiplexed by orthogonal codes. In the example of FIG. 8(a), CSI-RSs for antenna ports 17 and 18 may be located at REs expressed as CSI-RS CDM group 2 and they may be multiplexed by orthogonal codes. In the example of FIG. 8(a), CSI-RSs for antenna ports 19 and 20 may be located at REs expressed as CSI-RS CDM group 3 and they may be multiplexed by orthogonal codes. In the example of FIG. 8(a), CSI-RSs for antenna ports 21 and 22 may be located at REs expressed as CSI-RSs CDM group 4 and they may be multiplexed by orthogonal codes. The same principle as described with reference to FIG. 8(a) may be applied to FIGS. 8(b) to 8(e).

Figure 9:
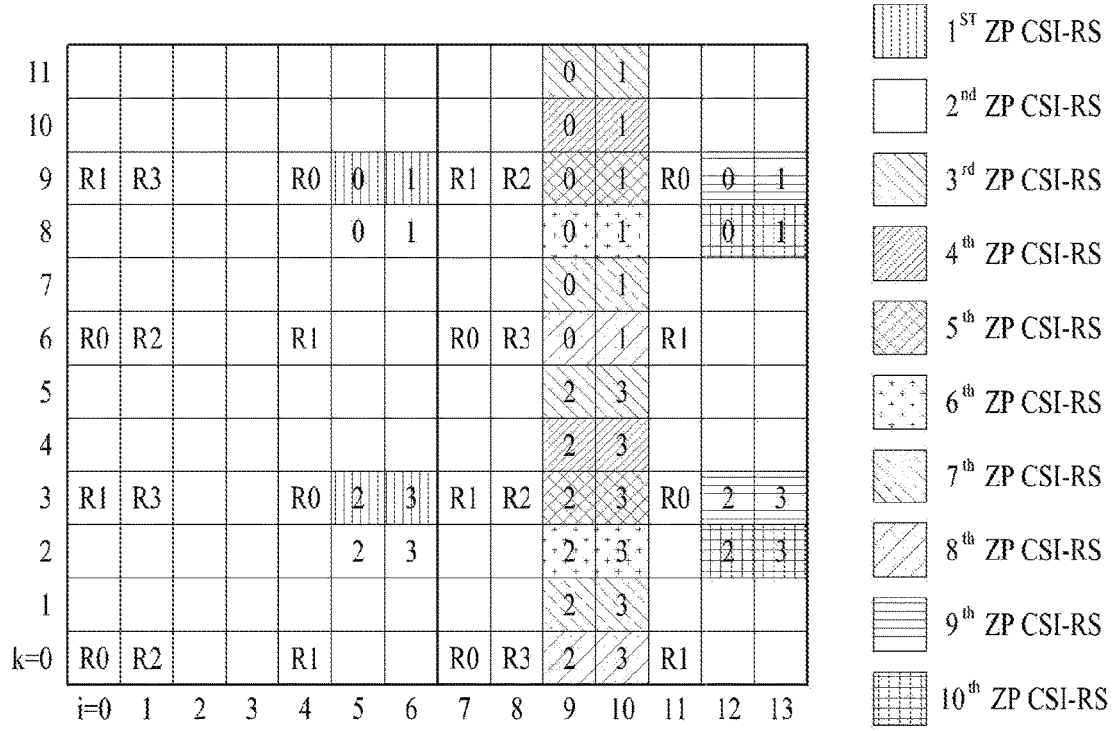
FIG. 9 is a diagram illustrating an exemplary zero-power (ZP) CSI-RS pattern defined for the LTE-A system.

FIG. 9 is a diagram illustrating an example of a zero-power (ZP) CSI-RS pattern defined in the LTE-A system. There are two main purposes of a ZP CSI-RS. First of all, the ZP CSI-RS is used for CSI-RS performance improvement. That is, in order to improve performance of measurement for CSI-RS of a different network, a network may perform muting on a CSI-RS RE of the different network and then inform a UE in the corresponding network of the muted RE by setting it to the ZP CSI-RS in order for the UE to perform rate matching correctly. Second, the ZP CSI-RS is used for the purpose of measuring interference for a CoMP CQI calculation. That is, if a certain network performs muting on a ZP CSI-RS RE, a UE can calculate a CoMP CQI by measuring interference from the ZP CSI-RS.

The RS patterns of FIGS. 6 to 9 are purely exemplary and various embodiments of the present invention is not limited to a specific RS pattern. In other words, even when an RS pattern different from the RS patterns of FIGS. 6 to 9 is defined and used, the various embodiments of the present invention can be applied in the same manner.

Full Duplex Radio (FDR) Transmission

The FDR system means a system that enables a transmitting device to simultaneously perform transmission and reception through the same resource. For instance, an eNB or a UE supporting the FDR may perform transmission by dividing uplink/downlink into frequency/time without duplexing.

Figure 10:
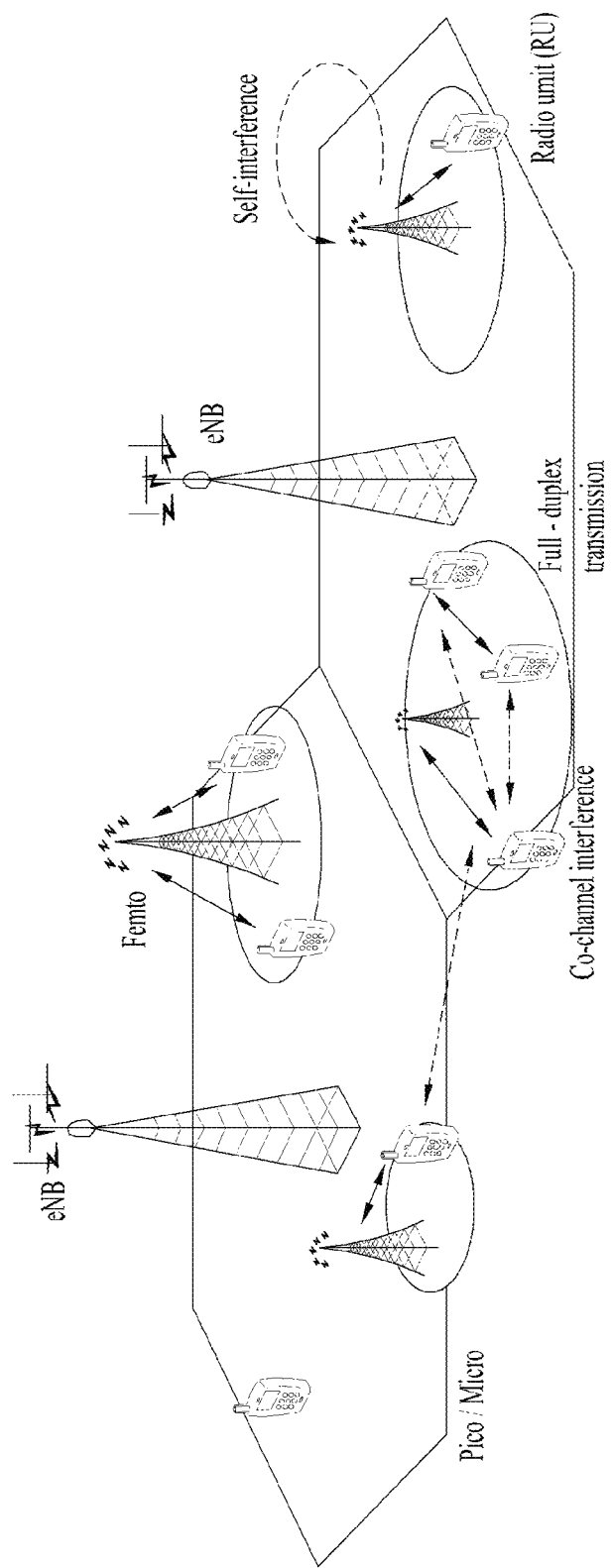
FIG. 10 illustrates an exemplary system supporting FDR transmission.

FIG. 10 illustrates an exemplary system supporting FDR transmission.

There are two types of interference in the FDR system. The first type of interference is self-interference (SI). The SI means that a signal transmitted from a transmitting antenna of an FDR device is received by a receiving antenna of the corresponding FDR device, thereby acting as interference. Such SI can be referred to as intra-device interference. In general, a self-interference signal is received with high power compared to a desired signal. Thus, it is important to cancel the SI through interference cancellation.

Figure 11:
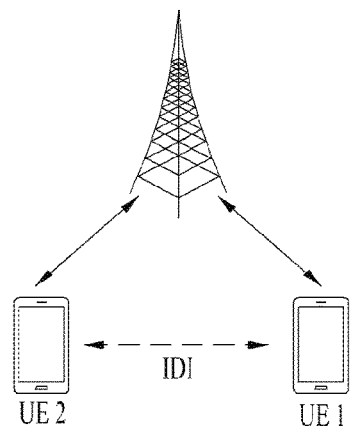
FIG. 11 illustrates inter-device interference (IDI).

The second type of interference is inter-device interference (IDI) shown in FIG. 11. The IDI means that a UL signal transmitted by an eNB or a UE is received by a neighboring eNB or another UE, thereby acting as interference.

The SI and IDI occurs only in the FDR system because the same resource is used in a cell. Since half-duplex (e.g., FDD, TDD, etc.) in which frequency or time is allocated for each of uplink and downlink has been used in the legacy communication system, interference has not been occurred between uplink and downlink. However, in an FDR transmission environment, since the same frequency/time resource is shared between uplink and downlink, the above-mentioned interference occurs.

For convenience of description, the present invention will be described based on the IDI.

FIG. 11 is a reference diagram for explaining the IDI. Referring to FIG. 11, since the same radio resource is used in a single cell, the IDI occurs only in the FDR system. FIG. 11 is a diagram illustrating the concept of the IDI caused when an eNB uses full-duplex (FD) mode (i.e., mode for simultaneously performing transmission and reception using the same frequency) on the same resource. Although FIG. 11 shows only two UEs for convenience of description, it is apparent that the present invention can be applied to a case where two or more UEs exist.

In the legacy communication system, since signal transmission and reception is performed using FDD (frequency division duplex) or TDD (time division duplex), i.e., different resources are used for the signal transmission and reception, the IDI does not occur. Although interference from a neighboring cell, which occurs in the legacy system, is also present in the FDR system, it is not described in the present invention for convenience of description.

Figure 12:
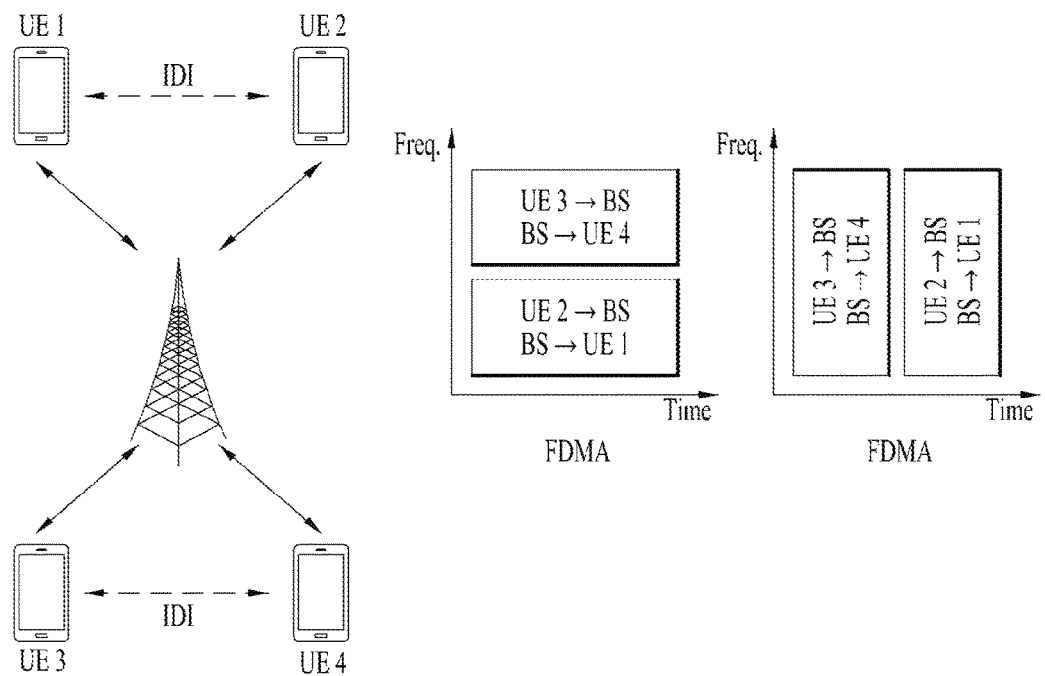
FIG. 12 illustrates multi-access performed by user equipments in the FDR system.

FIG. 12 is a reference diagram for explaining multi-access performed by UEs in the FDR system. Referring to FIG. 12, not only an FD scheme operated on the same resource but also an FD scheme operated on different resources may be present in the FDR system. FIG. 12 illustrates exemplary FDMA and TDMA operations when an eNB operates in FD mode on the same resource and a plurality of UEs perform multi-access.

In addition, the present invention assumes that a TDD system using FD communication on the same resource adopts a frame configuration for measuring interference between unsynchronized devices and a configuration for trying to transmit and receive signals for identifying devices. Based on the above assumption, simultaneous transmission and reception can be enabled in a single cell according to a UE-specific configuration where a different configuration is allocated to a UE in each cell.

Meanwhile, a preamble means a signal used for obtaining synchronization during a cell search procedure. The preamble can be called a midamble, a synchronization signal, or a synchronization channel depending on a system. Although the preamble can be configured such that a cell ID is obtained using a single signal, the cell ID may be obtained using two signals such as a first synchronization signal and a second synchronization signal. In addition, the preamble can be used to obtain not only the cell ID but also a UE ID or a group of UE IDs. As an example of the preamble used to obtain the UE ID or the group of UE IDs, a signature signal is described.

According to the present invention, after IDI is measured, a unique signature can be assigned to each UE or each UE group to reduce or cancel the measured IDI. In this case, a signal capable of identifying an interference-causing UE for interference measurement is referred to as the signature signal.

Thus, by receiving the signature signal, a UE can obtain a signal strength of an IDI-causing UE, a UE or signature index, a channel vector such as a phase, timing information, etc. In addition, the signature signal may be implemented in any form capable of identifying a UE or a UE group, for example, as a code sequence or a puncturing pattern. That is, unique scrambling or interleaving may be applied to the UE/UE group using the code sequence. Moreover, to facilitate interference measurement at a receiving UE, the signature signal may be transmitted from a single UE/UE group in an exclusive manner. In this case, a minimum unit configured for the exclusive operation may be one OFDM symbol.

For example, assuming that a sequence of the signature signal is mapped to one OFDM symbol and then transmitted, an index of a sequence to be transmitted by each UE can be calculated through a UE ID. In other words, the sequence of the signature signal can be expressed as a function of the UE ID. If a size of data constituting the UE ID is greater than the sequence index, the index can be calculated based on modular operation as shown in Equation 12.

$$\text{Sequence Index} = (\text{UE ID}) \bmod (\text{Total index number}) \quad \text{[Equation 12]}$$

According to an embodiment, to distinguish between signature signals, an m-sequence may be configured using the UE ID or the sequence index. In a secondary synchronization signal (SSS) of the LTE system, an m-sequence shown in Equation 13 is used.

$$m_0 = m' \bmod 31 \quad \text{[Equation 13]}$$
$$m_1 = (m_0 + \lfloor m'/31 \rfloor + 1) \bmod 31$$
$$m' = N_{ID}^{(1)} + q(q+1)/2,$$

$$q = \left\lfloor \frac{N_{ID}^{(1)} + q'(q'+1)/2}{30} \right\rfloor, q' = \lfloor N_{ID}^{(1)}/30 \rfloor$$

The UE ID or the sequence index is used for $N^{(1)}{}_{ID}$, m' is obtained from the $N^{(1)}{}_{ID}$, and the signature signal is distinguished from another one.

Hereinafter, details of IDI measurement will be described. The IDI is caused by use of the same resource. For example, if the number of IDI-causing UEs and the number of IDI-measuring UEs are N, the IDI measurement should be performed $({}_NC_2 *2)$ times. In the FDR system, since frequency and transmission time in uplink is equal to that in downlink, channel reciprocity can be allowed between transmitting and receiving devices.

In a system using full-duplex communication on the same resource, UEs can be grouped to facilitate control of interference between UEs (i.e., IDI), i.e., to avoid or mitigate the IDI. The present invention defines a method for reducing the number of times of IDI measurement when a UE group is updated periodically or if necessary. For example, it is possible to define a scheme for allowing UEs to generate measurement configurations by considering channel reciprocity instead of receiving the configurations from an eNB. In addition, it is also possible to define a grouping method for scheduling IDI-causing UEs in the FDR system and an IDI measurement and reporting method for grouping. For instance, UEs may be grouped based on the amount of IDI measured by each UE. Moreover, a method for grouping UEs based on the amount of IDI by considering IDI cancellation/mitigation capability of each UE instead of using the number of UEs sharing the same resources may be applied. Furthermore, according to the present invention, it is possible to define a method for measuring and reporting low complexity of IDI when a configured group is updated either periodically or aperiodically. For example, each UE may determine a basic subframe configuration pattern based on the number of times of IDI measurement required in a UE group to which the corresponding UE belongs and then perform IDI measurement as many as times as the UE is assigned, by applying a UE-specific shift value.

In the TDD system, since uplink/downlink frequency is the same, channel reciprocity is allowed between transmitting and receiving devices. The channel reciprocity is also allowed in the FDR system with the same reason. That is, IDI can be measured by one of a UE pair having valid channel reciprocity rather than all UEs.

Figures 13, 14:
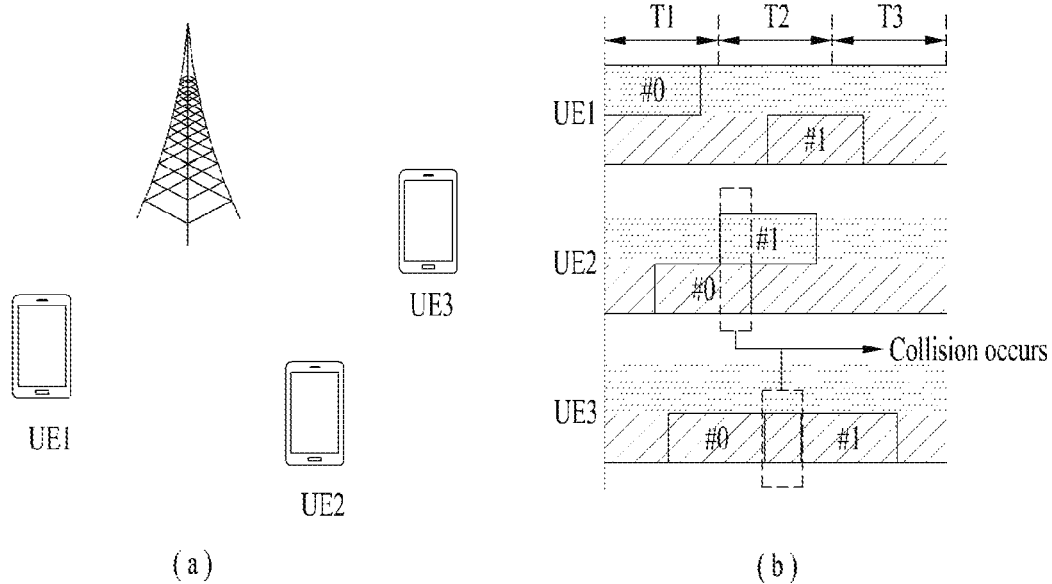
FIG. 13 is a diagram for explaining an exemplary IDI measurement method applicable to the present invention.
FIG. 14 is a diagram illustrating a concept of IDI caused when interference is measured as shown in FIG. 13.

FIG. 13 is a diagram for explaining an exemplary IDI measurement method applicable to the present invention. Specifically, FIG. 13 shows a subframe configuration according to an embodiment of the present invention.

According to the present embodiment, an eNB can inform all UEs of a UL/DL subframe configuration. For example, in the case (a) of FIG. 13, all UEs may have the same number of times of measurement. In addition, in a time unit (e.g., one subframe) for measurement, only one target UE may be assigned a UL subframe and the remaining UEs may be assigned a DL subframe.

When UEs have the same measurement load, the eNB may transmit the subframe configuration as follows. The eNB may transmit a basic subframe pattern and cyclic shift values for the corresponding pattern to the UEs. For example, when the basic subframe pattern is [U, D, D, D, D], UE A may use the basic subframe pattern as it is and in this case, a cyclic shift value for the UE A becomes 0. If a cyclic shift value for UE B is set to 1, a subframe pattern for the UE B may be determined as [D, U, D, D, D] by shifting the basic subframe pattern to the right by 1. As described above, the eNB may determine the subframe configuration for the UE A and then use UL subframe shift values.

The FDR system means a system capable of supporting simultaneous transmission and reception using the same time and frequency resources. For example, as shown in FIG. 13, UE1 may perform UL operation and UE2 may perform DL operation at the same time. In other words, a UE supporting the FDR transmission means a UE capable of supporting both UL transmission and DL transmission.

However, when an eNB assigns a subframe configuration for UEs as described above, it may cause the problem shown in FIG. 14.

FIG. 14 is a diagram illustrating a concept of IDI caused when interference is measured as shown in FIG. 13.

In FIG. 14, assume a case where subframe configurations A, B, and C shown in FIG. 13 are assigned to UE 1, UE 2, and UE 3, respectively. In addition, it is also assumed that when the UE 1, UE 2, and UE 3 perform transmission, they use a timing advance to synchronize with an eNB in terms of reception.

Referring to FIG. 14, the UE 1 transmits a signal in subframe #0 and receives a signal in subframe #1 according to its subframe configuration. The UE 2 receives a signal in subframe #0 and transmits a signal in subframe #1 according to its subframe configuration. The UE 3 performs signal reception in both subframes #0 and #1 according to its subframe configuration. In this case, from the perspective of the UE 2, a signal transmitted in an interval T1 where a propagation delay from the UE 1 occurs overlaps with a signal to be transmitted in an interval T2. In addition, from the perspective of the UE 3, signals affected by propagation delays from the UE 1 and UE 2 overlap with each other and are then received. Thus, there may occur a problem that the UE2 and UE 2 are unable to perform accurate interference measurement.

In this case, interference measurement should be accurately performed in order to precisely allocate resources for multiple users. Thus, the accurate interference measurement must be achieved. To this end, a scheme of preventing signature signals for identifying UEs or interference measurement signals for measuring the amount of interference from overlapping with each other is required for the accurate interference measurement. Hereinafter, methods for performing accurate interference measurement will be described. More particularly, methods of designing a signal for preventing IDI signals from overlapping with each other will be described.

<First Embodiment—Signal Design for Interference Avoidance>

Figure 15:
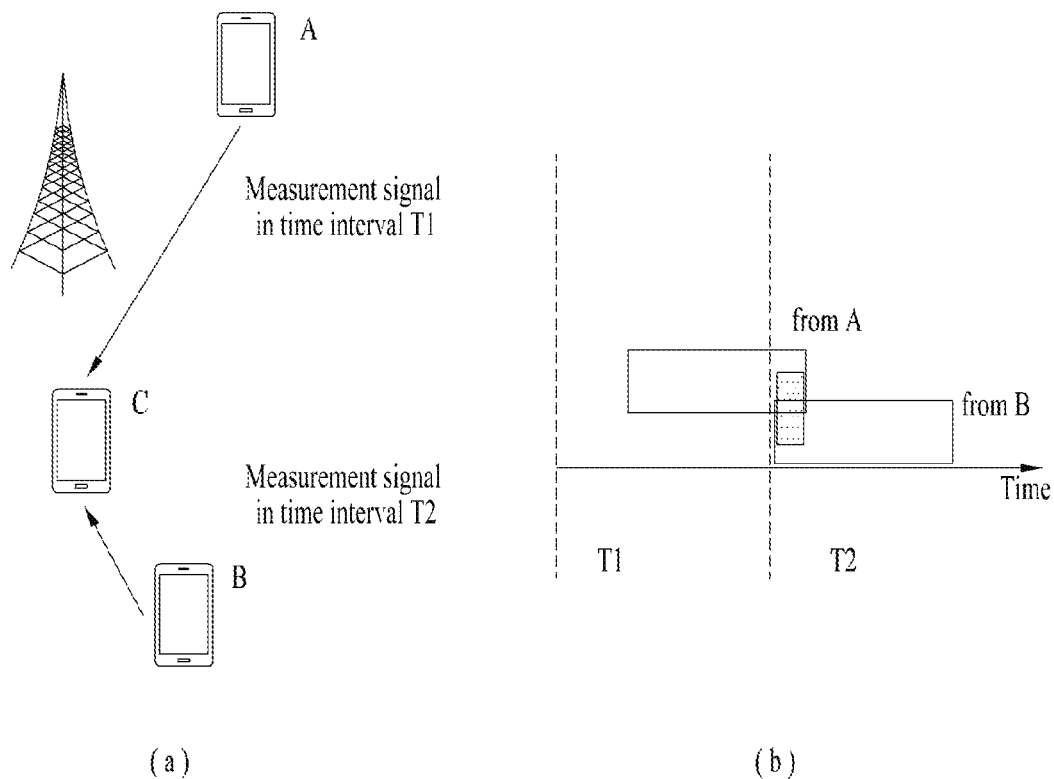
FIG. 15 is a diagram illustrating a concept of overlap occurring between received signals.

First, signals transmitted in the intervals T1 and T2 should not be received in an overlapping manner. If a transmission time for transmitting a signature signal is increased, there may be a gap between transmission times and thus, received signals may not overlap with each other. However, a measurement time is also increased. Therefore, the present invention proposes a method for designing a signature signal (hereinafter referred to as a preamble) to distinguish between signals without change in the measurement time even though the signals overlap with each other at reception timings. FIG. 15 illustrates a case where signals are received in an overlapping manner depending on locations of UEs. In this case, UE A and UE B transmit signals during intervals T1 and T2, respectively and UE C receives the signal. In FIG. 15 (a), assume that UEs A and B are located apart from each other as far away as possible within a cell radius to maximize a timing advance and a propagation delay. In addition, it is also assumed that UE C is located adjacent to one (e.g., UE B in FIG. 15) of transmitting UEs so that signals overlap with each other as much as possible and then are received.

In this case, the signals include a signal transmitted in a measurement subframe corresponding to a measurement target. In addition, a signal for interference measurement, e.g., a reference signal may be transmitted in the measurement subframe. Moreover, the signature signal may be contained in the measurement subframe. If a UE recognizes a UE capable of transmitting a signal using the signal for the interference measurement, transmission or reception of the signature signal may be dropped. When the signature signal and the reference signal is transmitted in one subframe, the signature signal may be transmitted before the reference signal. However, in some cases, the signature signal and the reference signal may be transmitted in the same symbol and in this case, they may be transmitted in different frequency regions.

FIG. 15 (b) shows a signal reception timing of the UE C. Specifically, the signal transmitted from the UE A is received in the interval T1 and the signal transmitted from the UE B is received in the interval T2. The tail portion of the signal transmitted from the UE A overlaps with the head portion of the signal transmitted from the UE B. In this case, each of the signals transmitted from the UEs A and B may be a signal transmitted in the measurement subframe, i.e., a resource unit configured for measurement. In addition, the measurement subframe may be composed of at least one subframe. The present invention proposes to design signals by adding guard times (GTs) to both ends of a preamble transmitted in the measurement subframe in consideration of an overlapping section.

Figure 16:
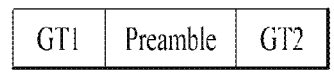
FIG. 16 is a diagram for explaining signal design for interference avoidance according to an embodiment of the present invention.

FIG. 16 is a diagram illustrating a preamble for IDI measurement applicable to an embodiment of the present invention.

Hereinafter, a method for avoiding signal overlapping by adding guard times to both ends of a preamble is described with reference to FIG. 16. In the following description, a guard time configured before the preamble is referred to as a first guard time (GT 1 of FIG. 16) and a guard time configured after the preamble is referred to as a second guard time (GT 2 of FIG. 16).

At least one of the GT 1 and the GT 2 may be configured as a zero-power interval. Alternatively, a cyclic prefix (CP) may be inserted into the at least one of the GT 1 and the GT 2.

For example, if the GT 1 is configured as the zero-power interval and the CP is inserted into the GT 2, it could be interpreted as that there is no signal transmitted at the front portion of the signal received from the UE B. Thus, it is possible to obtain the same effect as that obtained by eliminating overlapping between received signals using the guard time. Hence, according to the present invention, a signal transmitted from a UE can be distinguished from one another except a case where there is a transmit power in both of the GT 1 and the GT 2.

In this case, the GT 1 and/or the GT 2 can be configured in consideration of a transmission delay. Similarly, the GT 1 and/or the GT 2 may be configured by considering a timing advance. In other words, the GT 1 and/or the GT 2 may be determined by considering a cell radius and a minimum length of each guard time may be 1 RTT (round-trip time). For example, when a cell radius is 200 m, a guard time may be 41 samples.

In this case, the preamble can be mapped to the measurement subframe and then transmitted. In particular, the preamble may be loaded in the front portion of the measurement subframe. The sum of a time interval for the preamble and a time interval corresponding to the GT 1 and/or the GT 2 may match a length of at least one symbol. For example, the sum of the time interval for the preamble and the time interval corresponding to the GT 1 and/or the GT 2 may be a length of N symbols (where N is a positive integer).

In addition, the GT 1 may start from a starting point of the subframe. If the GT 1 is not configured, the preamble may start from the starting point of the subframe. For example, if the sum of time intervals for the preamble, GT 1, and GT 2 is one symbol, the preamble, GT 1, and GT 2 may be located in the first symbol of the measurement subframe.

When the preamble is configured as described above, the preamble may be configured to have a length different from that of the conventional preamble. Thus, a sequence for the new preamble needs to be generated and in this case, constant amplitude zero autocorrelation (CAZAC) sequences may be used to guarantee orthogonality of the new sequence. To this end, a cyclic shift value, a root index value, etc. may be determined and an eNB can transmit the cyclic shift value, the root index value, the sequence length, and the like to each UE.

As an example in which only the reference signal is transmitted without transmission of the signature signal, a case where a reference signal symbol is located at the front portion of the subframe may be considered. In this case, the reference signal may have the same structure as that shown in FIG. 16 to prevent signal overlapping. That is, the GT 1 may be located in a time interval before the reference signal symbol and the GT 2 may be located in a time interval after the reference signal symbol. Moreover, the details of the preamble can also be applied to the reference signal symbol.

Further, when the signature signal and the reference signal are transmitted in the same symbol of one subframe, the above-mentioned details can be identically applied. In this case, the signature signal and the reference signal may be transmitted through different frequency resources.

The reference signal for the IDI measurement may be transmitted in either one symbol or a plurality of symbols of the measurement subframe.

When the reference signal is transmitted in one symbol, the reference signal can be transmitted in the first symbol of the measurement subframe. In this case, the reference signal mapped to the first symbol may be located between the GT 1 and GT 2 as described above. Alternatively, when the reference signal is transmitted in the last symbol of the measurement subframe, the reference mapped to the last symbol may be located between the GT 1 and GT 2 as described above. When the above-mentioned structure is applied to the last symbol, the GT 2 may be used to prevent the signal overlapping.

On the other hand, when the reference signal is transmitted through a plurality of symbols and when the reference signal is transmitted at least in the first symbol of the measurement subframe, the structure illustrated in FIG. 16 can be applied to the first symbol. Similarly, when the reference signal is transmitted at least in the last symbol of the measurement subframe, the structure illustrated in FIG. 16 can be applied to the last symbol. In some cases, the structure illustrated in FIG. 16 can be applied to both of the first and last symbols.

Alternatively, only the GT 1 may be applied to the first symbol of the measurement subframe where the reference signal is mapped and only the GT 2 may be applied to the last symbol. By doing so, it is possible to prevent the GT 1 and GT 2 from being applied in an overlapping manner.

The measurement subframe is composed of N symbols and includes symbols from symbol index #0 to symbol index #(N−1). An index of the aforementioned first symbol corresponds to the symbol index #0 of the measurement subframe and an index of the last symbol corresponds to the symbol index #(N−1). In addition, when the subframe structure defined in the LTE system is used, N is 12 in the case of the normal CP or N is 14 in the case of the extended CP.

Based on the above description, UE operation is described in detail. As shown in FIG. 15 (*b*), the UE C receives a reference signal from the UE A through a measurement subframe during a time interval T1 and receives a reference signal from the UE B through a measurement subframe during a time interval T2. In this case, the front portion of a subframe corresponding to the time interval T2 is configured as the GT 1. If the GT 1 is configured as the zero-power interval, the UE C may consider that the signal from the UE A does not overlap with the signal from the UE B. Therefore, even if the signals overlap with each other at reception timings, the UE C can distinguish between the signal from the UE A and the signal from the UE B without changing a measurement time.

The interference measurement signal and the reference signal can be designed as follows.

<Second Embodiment—Change of Sampling Frequency for Interference Avoidance>

Figure 17:
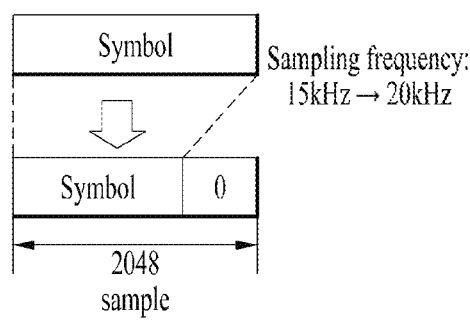
FIG. 17 is a diagram for explaining signal design for interference avoidance according to another embodiment of the present invention.

To avoid overlapping between the individual UEs, it is possible to use a scheme for increasing a sampling frequency. FIG. 17 shows an example of changing a sampling frequency for interference avoidance.

To prevent signals from overlapping with each other, the length of the reference signal symbol where the reference signal is mapped can be reduced by increasing the sampling frequency. In this case, assume that a symbol sample length is fixed. For example, a sample frequency used in the legacy system may be increased from 15 kHz to 20 kHz. That is, as shown in FIG. 17, when the sampling frequency is increased while a sample length is fixed, a symbol length is reduced and a reference symbol length is also reduced. Therefore, an interval corresponding to a length difference between the reference symbol and the legacy symbol can be configured as the zero-power interval. Here, the zero-power interval may mean that a transmit power is 0 or NULL and there is no signal transmitted in this interval.

In other words, when a sampling frequency is changed as described above, the end of a signal is set as the zero-power interval. Thus, the UE C may consider that the UE A's signal in the overlapping interval of FIG. 15 to have a zero power.

<Third Embodiment—Change in Frame Structure>

Another embodiment of the present invention proposes to add a zero-power interval to a reference signal symbol to prevent signal overlapping that occurs in a UE. Particularly, it is proposed that the zero-power interval is added to a tail portion of a reference signal symbol where not only the symbol but also a CP are included.

Figure 18:
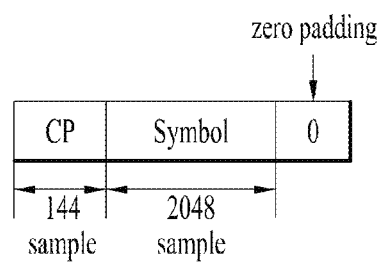
FIG. 18 is a diagram for explaining signal design for interference avoidance according to a further embodiment of the present invention.

FIG. 18 defines a structure where a zero-power interval is added to a tail portion of a reference signal symbol to which a reference signal is mapped. That is, the new frame structure can be defined by adding the zero-power interval to the tail portion of the reference signal symbol. According to the frame structure of the legacy system, i.e., the conventional frame structure, 7 symbols are included in one slot in the case of the normal CP. However, when the zero-power interval is added according to the present invention, less than 7 symbols are included in one slot in the case of the normal CP.

Alternatively, the entirety of a symbol appearing after the reference signal symbol may be set as the zero-power interval.

In addition, when the zero-power interval is added to the tail portion of the reference signal symbol, an eNB may inform a UE whether the zero-power interval is configured.

Figure 19:
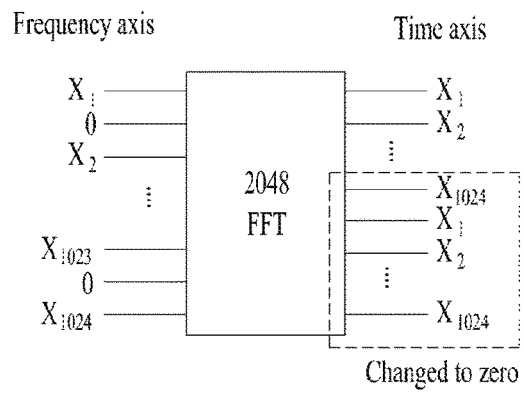
FIG. 19 is a diagram illustrating a zero-padding scheme applicable to the present invention.

Hereinafter, a method for configuring the zero-power interval applicable to the present invention will be described with reference to FIG. 19.

To configure the zero-power interval according to the present invention, a zero-padding scheme can be used on a frequency axis. If some data values are replaced with '0' on the frequency axis, data on a time axis may be repeated. For example, if half of data is replaced with '0' or if half of data is used and the remaining half of the data is set to '0', the same data may repeatedly appear on the time axis. Referring to FIG. 19, when half of data is set to '0' on the frequency axis, $x_1$ to $x_{1024}$ repeatedly appear on the time axis. In this case, the zero-power interval can be configured by eliminating the repeated data $x_1$ to $x_{1024}$ and inserting '0'.

The elements and features of the present invention can be applied when the aforementioned embodiment are combined with another one. In other words, a sequence of operations explained for each embodiment of the present invention may be modified. Some configurations or features of one embodiment may be included in another embodiment or can be substituted for corresponding configurations or features of another embodiment.

Figure 20:
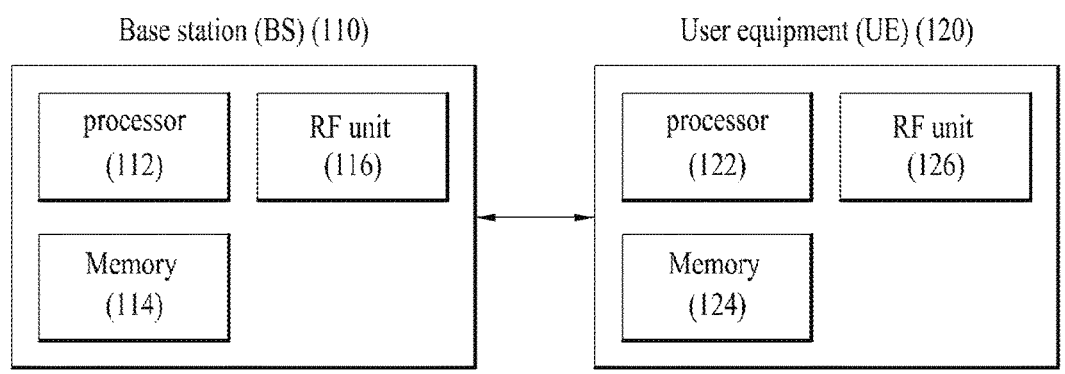
FIG. 20 is a block diagram illustrating an exemplary base station and user equipment applicable to the present invention.

FIG. 20 is a block diagram illustrating a base station and a user equipment according to an embodiment of the present invention. To avoid redundant description, the above-described features will be omitted herein. The BS and the UE of FIG. 19 can perform the aforementioned IDI measurement methods.

If a relay node is included in a wireless communication system, communication in a backhaul link is performed between a base station and the relay node and communication in an access link is performed between the relay node and a user equipment. Therefore, the base station or user equipment shown in the drawing can be substituted with the relay node in some cases.

Referring to FIG. 20, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas According to an embodiment of the present invention, the processor 122 maps a preamble to a measurement subframe. In addition, the processor 122 transmits a reference signal through the measurement subframe to which the preamble is mapped. Moreover, the processor 122 can set a prescribed time interval before the preamble as a first guard time interval.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to wireless communication devices such as a user equipment, a relay, and a base station.

What is claimed is:

1. A method of transmitting a preamble for interference measurement by a transmitting user equipment (UE) in a wireless communication system supporting full duplex radio (FDR), the method comprising:
   configuring, by the transmitting UE, a first guard time and a second guard time by using a zero-padding scheme in which a half of data on a frequency axis of the preamble is set to zero,
   wherein the first guard time is a prescribed time set before the preamble, and the second guard time is a prescribed time set after the preamble;
   mapping the preamble with the first guard time and the second guard time to a measurement subframe for measuring interference between UEs,
   wherein a sum of a time interval for the preamble and a time interval corresponding to the first guard time and the second guard time corresponds to a unit length of a symbol; and
   transmitting, via a transceiver module, the preamble to a receiving UE through the measurement subframe.

2. The method of claim 1, wherein at least one of the first guard time and the second guard time is set as a zero-power transmission interval.

3. The method of claim 1, wherein at least one of the first guard time and the second guard time is set as a cyclic prefix (CP).

4. The method of claim 1, wherein at least one of the first guard time and the second guard time is determined in consideration of a propagation delay.

5. The method of claim 1, wherein the preamble is generated using a constant amplitude zero autocorrelation (CAZAC) sequence.

6. The method of claim 5, further comprising:
   receiving, via a transceiver module, information for generating the preamble from a base station (BS),
   wherein the information for generating the preamble comprises at least one of a cyclic shift value of the preamble, a root index value of the preamble, a sequence length of the preamble.

7. A transmitting user equipment (UE) in a wireless communication system supporting full duplex radio (FDR), the transmitting UE comprising:
   a transceiver module configured to transmit and receive signals to and from a receiving UE or a base station (BS); and
   a processor,
   wherein the processor is configured to:
   configure a first guard time and a second guard time by using a zero-padding scheme in which a half of data on a frequency axis of the preamble is set to zero, wherein the first guard time is a prescribed time set before the preamble, and the second guard time is a prescribed time set after the preamble,
   map the preamble with the first guard time and the second guard time to a measurement subframe for measuring interference between UEs, wherein a sum of a time interval for the preamble and a time interval corresponding to a first guard time and a second guard time corresponds to a unit length of a symbol, and
   control the transceiver module to transmit the preamble to the receiving UE through the measurement subframe.

* * * * *